(12) United States Patent
Gardell

(10) Patent No.: US 11,226,183 B1
(45) Date of Patent: Jan. 18, 2022

(54) THROWABLE PAINT BALLS, KIT, AND METHOD OF MANUFACTURE

(71) Applicant: Briana Gardell, Bethlehem, PA (US)

(72) Inventor: Briana Gardell, Bethlehem, PA (US)

(73) Assignee: Mezzimatic LLC, Bethlehem, PA (US)

( * ) Notice: Subject to any disclaimer, the term of this patent is extended or adjusted under 35 U.S.C. 154(b) by 198 days.

(21) Appl. No.: 16/250,120

(22) Filed: Jan. 17, 2019

Related U.S. Application Data

(63) Continuation-in-part of application No. 15/599,508, filed on May 19, 2017, now Pat. No. 10,184,765, which is a continuation-in-part of application No. 15/134,428, filed on Apr. 21, 2016, now abandoned.

(60) Provisional application No. 62/487,007, filed on Apr. 19, 2017, provisional application No. 62/150,346, filed on Apr. 21, 2015.

(51) Int. Cl.

| | |
|---|---|
| *C09D 11/00* | (2014.01) |
| *C09D 5/00* | (2006.01) |
| *F42B 12/40* | (2006.01) |
| *A63B 39/00* | (2006.01) |
| *C09D 7/20* | (2018.01) |
| *C09D 7/65* | (2018.01) |
| *C09D 7/61* | (2018.01) |
| *C09D 7/44* | (2018.01) |
| *C09D 1/00* | (2006.01) |
| *C09D 4/00* | (2006.01) |
| *C09K 3/00* | (2006.01) |

(52) U.S. Cl.
CPC .............. *F42B 12/40* (2013.01); *A63B 39/00* (2013.01); *C09D 5/008* (2013.01); *C09D 7/20* (2018.01); *C09D 7/44* (2018.01); *C09D 7/61* (2018.01); *C09D 7/65* (2018.01)

(58) Field of Classification Search
USPC ................................ 106/31.01, 31.13, 31.92
See application file for complete search history.

(56) References Cited

U.S. PATENT DOCUMENTS

| | | | | |
|---|---|---|---|---|
| 5,393,054 | A * | 2/1995 | Rouffer | F42B 12/40 428/34.1 |
| 5,885,671 | A * | 3/1999 | Bayless | A61Q 19/00 428/34.1 |
| 6,393,992 | B1 * | 5/2002 | Vasel | F41B 15/02 102/367 |
| 6,450,100 | B1 * | 9/2002 | Carson | F42B 12/40 102/513 |
| 6,530,962 | B1 * | 3/2003 | Stolz | C09B 67/0071 102/502 |
| 7,883,774 | B1 * | 2/2011 | Baggs | C09B 67/0083 428/402.2 |
| 8,479,656 | B2 * | 7/2013 | Ciesiun | F42B 12/78 102/513 |
| 10,184,765 | B1 * | 1/2019 | Gardell | F42B 6/00 |
| 2005/0019294 | A1 * | 1/2005 | Modliszewski | A61K 8/0208 424/70.13 |
| 2005/0025968 | A1 * | 2/2005 | Liu | F42B 6/10 428/402 |
| 2005/0066841 | A1 * | 3/2005 | Vasel | F42B 7/10 102/502 |
| 2007/0079722 | A1 * | 4/2007 | Parish | F42B 12/42 102/513 |

(Continued)

*Primary Examiner* — James E McDonough
(74) *Attorney, Agent, or Firm* — Joseph E. Maenner; Maenner & Associates, LLC

(57) ABSTRACT

A paintball fill material includes water, a humectant, a thickener, and a dye.

18 Claims, 3 Drawing Sheets

(56) References Cited

U.S. PATENT DOCUMENTS

| | | | |
|---|---|---|---|
| 2007/0148380 A1* | 6/2007 | Black | F42B 12/40 428/34.1 |
| 2008/0000464 A1* | 1/2008 | Campo | F42B 12/40 124/71 |
| 2010/0064927 A1* | 3/2010 | Perrone | F42B 12/40 102/502 |
| 2010/0258024 A1* | 10/2010 | Delhaye | F42B 12/40 102/513 |
| 2011/0253009 A1* | 10/2011 | Black | C08L 99/00 106/160.1 |
| 2012/0097063 A1* | 4/2012 | Cranor | C09K 11/07 102/513 |
| 2012/0227614 A1* | 9/2012 | Sullivan | F42B 12/46 102/513 |

* cited by examiner

THROWABLE PAINT BALLS, KIT, AND METHOD OF MANUFACTURE

CROSS-REFERENCE TO RELATED APPLICATIONS

The present application is a continuation of U.S. patent application Ser. No. 15/599,508, filed on May 19, 2017, now U.S. Pat. No. 10,184,765, which is a continuation-in-part of U.S. patent application Ser. No. 15/134,428, filed on Apr. 21, 2016, which claims priority from U.S. Provisional Patent Application Ser. No. 62/150,346, filed on Apr. 21, 2015, and U.S. Provisional Patent Application Ser. No. 62/487,007, filed on Apr. 19, 2017, all of which are incorporated by reference herein in their entireties.

BACKGROUND OF THE INVENTION

Paintballs are used as projectiles to target an opponent in a simulated wargame. Paintballs are fired from compressed air operated guns and can travel at high velocities, requiring users to wear eye protection. Additionally, the high velocity of the paint balls can result in pain when a person is hit, often resulting in welts on the person's body. Paintball games are often played in fields and in wooded areas, away from populated areas, so that bystanders and property is not inadvertently hit by errant paintballs. Also, the equipment (paintballs, guns, safety glasses) can be expensive and should only be used by qualified adults.

It would be beneficial to provide paintballs that can be hand thrown by children, and that will not cause pain upon contact. It would also beneficial to provide paintballs that can be thrown and break on impact, but also survive shipping, making them more commercially viable.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method of making a throwable paintball. The method includes providing a solution of vegetable glycerin, distilled water, calcium chloride, cornstarch and dye; heating the solution until the solution reaches about 102 degrees C.; allowing the solution to cool to room temperature; squirting solution into solution of sodium alginate and distilled water; rinsing the paintballs with water; and heating the paintballs in a glycerin and distilled water solution at about 116 degrees C. for 40 about minutes.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION OF THE INVENTION

Figure 1:
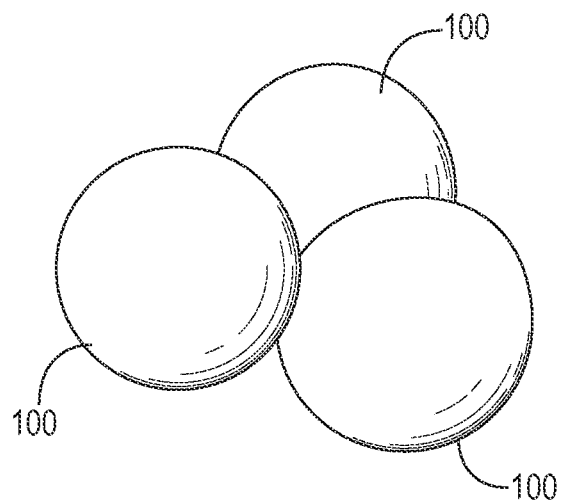
FIG. 1 is a perspective view of a plurality of paintballs according to the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Figure 1A:
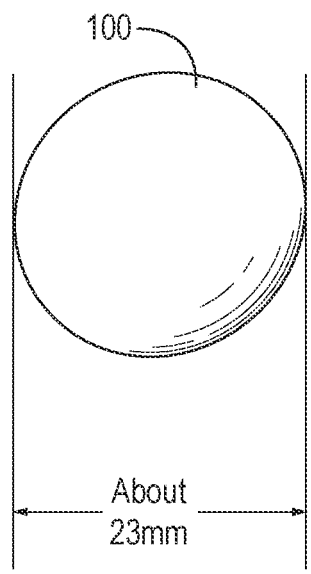
FIG. 1A is a perspective view of a single paintball according to the present invention, with exemplary dimensions.

Referring to FIGS. 1 and 1A, a paintball 100 according to an exemplary embodiment of the present invention is shown. Paintball 100 is sized such that a user paintball 100, with an effectiveness to break paintball 100 upon its impact with a solid surface. In an exemplary embodiment, as shown in FIG. 1A, paintball 100 is generally spherical in shape, with a diameter of about 26 mm.

Paintballs 100 are too large to fit into a standard paintball gun but are large enough to be able to be held in a user's hand so that the user can effectively throw paintball 100. In an exemplary embodiment, paintball 100 breaks when dropped from a height of about 200 millimeters, but will not typically break when dropped from a lower height.

Figure 2:
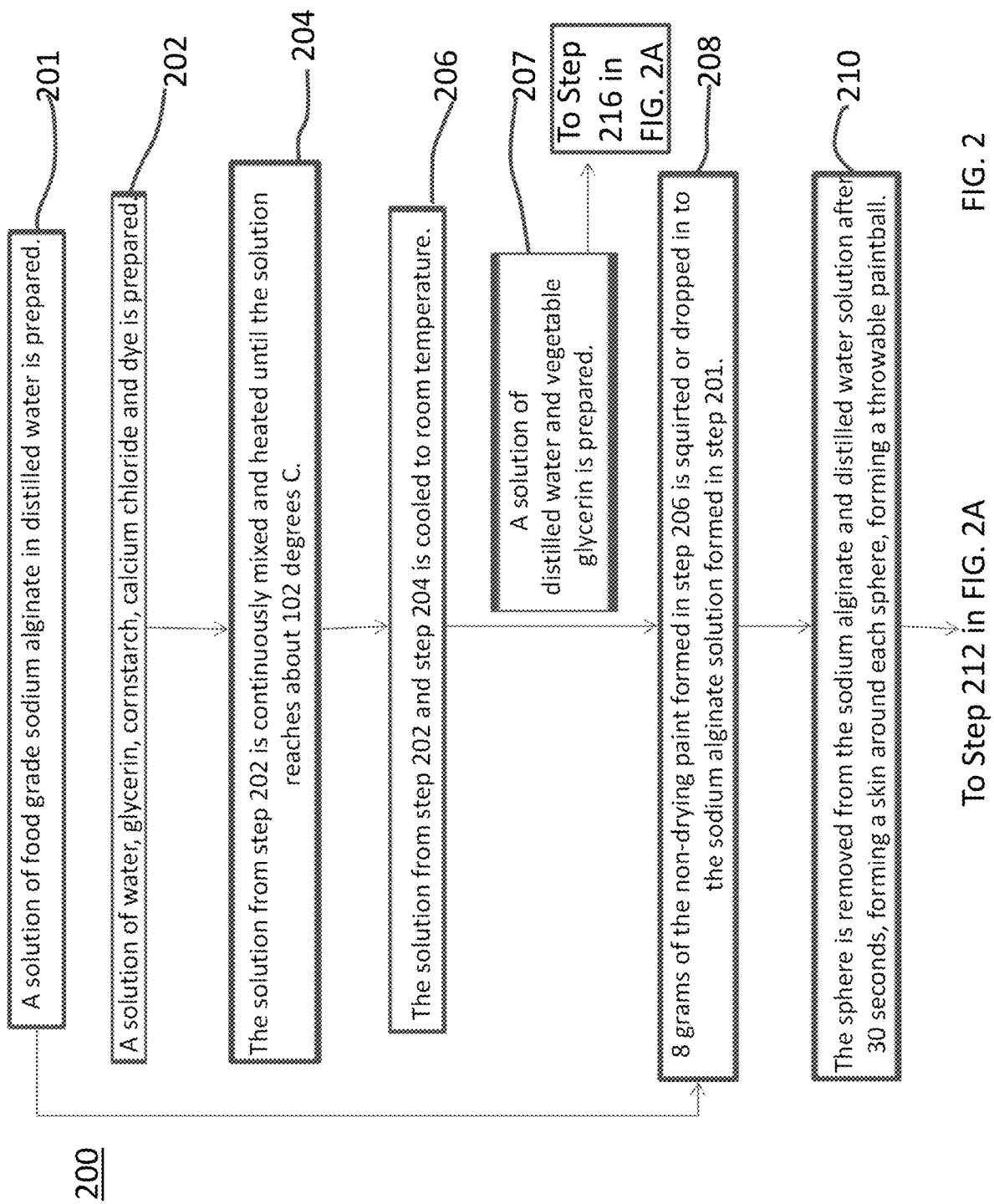
FIGS. 2 and 2A is a flowchart showing a first exemplary method for manufacturing paintballs according to the present invention.
Figure 2A:
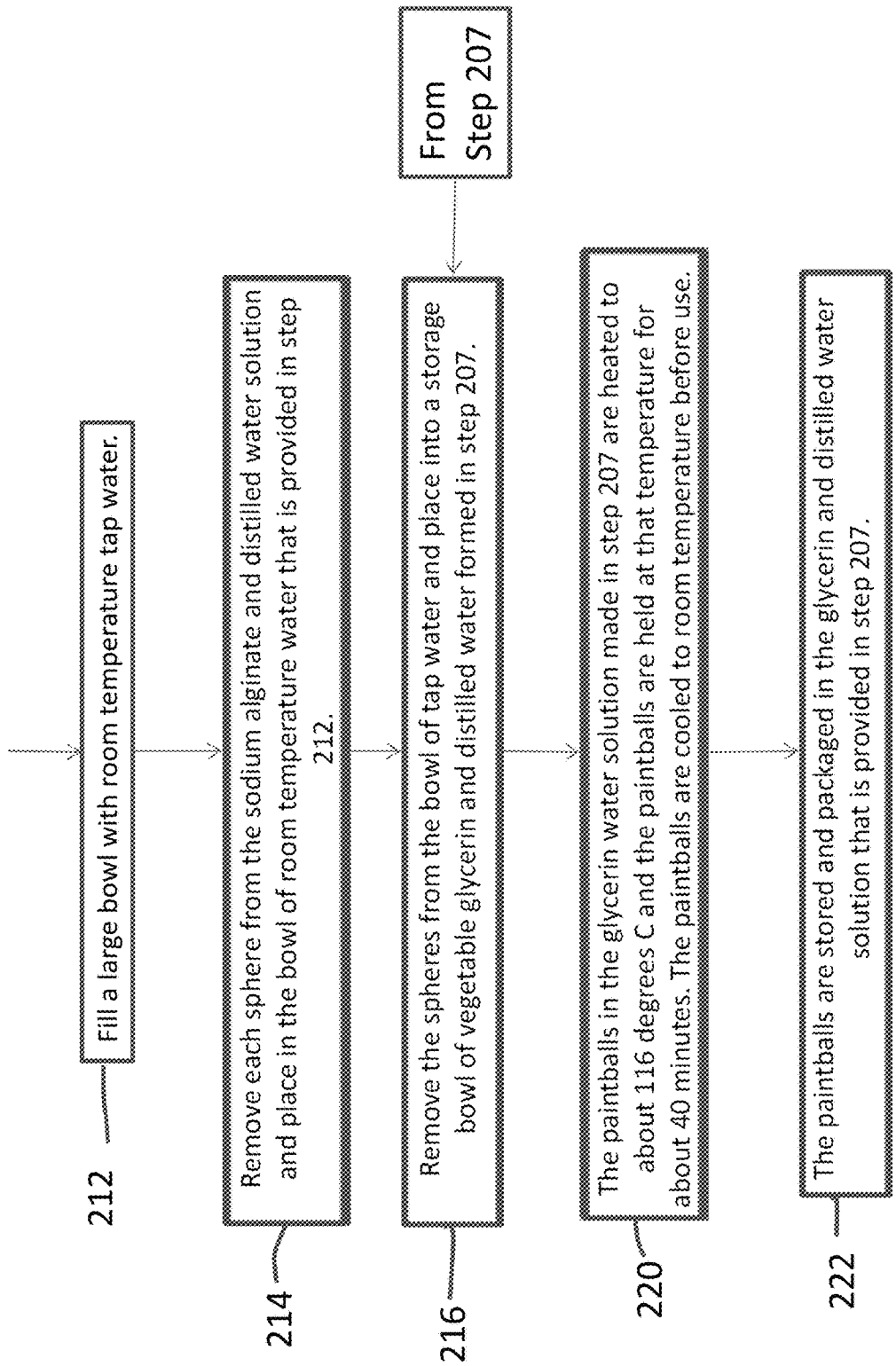

Referring to flowchart 200 in FIGS. 2 and 2A, an exemplary method of manufacturing paintball 100 is now disclosed. In step 201, a solution of food grade sodium alginate in distilled water is prepared. An exemplary solution includes between about 1.14% sodium alginate solution by weight is mixed with distilled water. While distilled water is used, in an alternative embodiment, non-distilled water can be used, as long as the non-distilled water is calcium-free. Calcium in the water can react with the solution and make the solution less potent. In an exemplary embodiment, the sodium alginate and water solution is at room temperature.

In an exemplary embodiment, about 570 grams of sodium alginate is mixed with about 50 kilograms of distilled water. The mixing can be performed with a hand mixer or a blender. The sodium alginate/distilled water solution is allowed to sit for about 24 hours. Those skilled in the art will know that pre-hydrated sodium alginate can be used to save processing time.

In step 202, a solution of water, a humectant such as glycerin, cornstarch, calcium chloride and dye is prepared to make paint for forming paintball 100. In an exemplary embodiment, distilled or purified water can be used. Instead of glycerin, other humectants such as sorbitol can be used. A preservative, however, may need to be added to prevent spoilage.

In an exemplary embodiment, about 47.8 wt % water, about 47.8 wt % glycerin, about 3 wt % cornstarch, about 1.3 wt % calcium chloride, and about 0.1 wt % dye is mixed together. While exemplary percentages are provided, those skilled in the art will recognize that other percentages can be used within the scope of the present invention to produce a paint of similar qualities. It is desired, however, that the weight percent of the water and the weight percent of the glycerin be approximately equal. The cornstarch and the calcium chloride act as thickeners, and their wt % in the solution can be adjusted to adjust the thickness or viscosity of the paint.

In an exemplary embodiment, about 1,000 grams of water, 1,000 grams of glycerin, 64 grams of cornstarch, 28 grams of calcium chloride, and between about 0 grams (for an opaque white color) and about 3 grams a dye is mixed. In an exemplary embodiment, about 0.6 grams of an Acid Yellow Dye 23 is used. Those skilled in the art, however, will recognize that different dyes can be used; vegetable, animal derived, and/or synthetic glycerin can be used; and calcium chloride can be excluded entirely.

In step 204, the solution from 202 is continuously mixed and heated until the solution reaches about 102° C. In an exemplary embodiment, an electric mixer with 700 RPM (revolutions per minute) mixes the solution while the solution is being heated with a natural gas flame. Those skilled in the art, however, will recognize that mixing by hand and other heating sources will provide comparable results. Although water typically boils at 100° C., the additional components of the solution raise the boiling temperature of the solution so that, at about 102° C., the water does not boil off. In step 206, the solution from step 202 and step 204 is cooled to room temperature, forming a non-drying paint.

In step 207 a solution of distilled water and vegetable glycerin is prepared. An exemplary solution includes between about 50% vegetable glycerin by weight is mixed with about 50% distilled water by weight. This solution is set aside until it is used in steps 216-222 as described below.

In step 208, 8 grams of the non-drying paint formed in steps 204-206 is squirted or dropped in to the sodium alginate solution (formed in step 202). The paint can be at the same temperature as the sodium alginate solution or, alternatively, the paint can be warmer than the sodium alginate solution.

In an exemplary embodiment, a peristaltic pump (not shown) releases the solution from step 206 from a tube (not shown) with a ¼ inch diameter at a speed of approximately 243 gallons/day for about 1 second. While a peristaltic pump is used, those skilled in the art will recognize that other methods and devices for dispensing the paint into the sodium alginate solution can be used.

The viscosity of the solutions makes play paint solution from step 206 to shape like a sphere and form a thin skin around the sphere from the reaction between the sodium alginate and the calcium chloride in the 2 solutions, forming paintball 100. It is desired to move the pump tube to a different location after making each paintball 100 because paintballs 100 can stick together if they touch each other, resulting in ruined paintballs.

In step 210, paintball 100 is removed from the sodium alginate and distilled water solution after about 30 seconds although those skilled in the art will recognize that paintballs 100 can be removed at various times, which can vary between about 1 second and about 1 minute. A skin forms around each sphere, forming a throwable paintball 100.

In step 212, fill a large bowl with room temperature tap water. In step 214, remove each sphere from the sodium alginate and distilled water solution with a slotted spoon and place in the bowl of room temperature water that is provided in step 212. In an exemplary embodiment, paintballs 100 are in the tap water for not longer than about 15 minutes. In step 216, remove paintballs 100 from the bowl of tap water and place into a storage bowl of vegetable glycerin and distilled water formed in step 207.

In step 220, the paintballs in the glycerin water solution made in step 207 are heated to about 116 degrees C. and the paintballs are held at that temperature for about 40 minutes. The paintballs are cooled to room temperature before use. Heating the paintballs hardens the thin membrane, which makes it harder to break while shipping the paintballs, but still break when thrown. Those skilled in the art will recognize that the paintballs can be heated at various temperatures and for various lengths of time to get various levels of durability.

In step 222, the paintballs are stored and packaged in the glycerin and distilled water solution that is provided in step 207.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A paintball fill material comprising:
   water;
   a humectant;
   a thickener having a weight percentage of about 4.3%; and
   a dye.

2. The paintball fill material according to claim 1, wherein the thickener comprises cornstarch.

3. The paintball fill material according to claim 1, wherein the thickener comprises calcium chloride.

4. The paintball fill material according to claim 3, wherein the thickener further comprises cornstarch.

5. The paintball fill material according to claim 1, wherein a weight percent of the water and a weight percent of the humectant are approximately equal.

6. The paintball fill material according to claim 1, wherein the weight percent of the water is about 47.8%.

7. The paintball fill material according to claim 1, wherein the weight percent of the humectant is about 47.8%.

8. The paintball fill material according to claim 1, wherein the material forms a non-drying paint.

9. A paintball fill material comprising:
   a weight percentage of water, wherein the weight percent of the water is about 47.8%;
   a like weight percentage of humectant;
   a thickener; and
   a colorant.

10. The paintball fill material according to claim 9, wherein the water comprises distilled water.

11. The paintball fill material according to claim 9, wherein the colorant comprises a dye.

12. The paintball fill material according to claim 9, wherein the thickener comprises cornstarch.

13. The paintball fill material according to claim 9, wherein the thickener comprises calcium chloride.

14. The paintball fill material according to claim 13, wherein the thickener further comprises cornstarch.

15. The paintball fill material according to claim 9, wherein the material forms a non-drying paint.

16. A paintball filler material comprising:
    distilled water;
    a humectant;
    about 4.3% by weight of a thickener; and
    a dye.

17. The paintball fill material according to claim 16, wherein the distilled water and the humectant are about the same weight percent.

18. The paintball fill material according to claim 17, wherein the weight percent of the distilled water and the humectant is about 47.8% of each.

* * * * *